Figure 1:
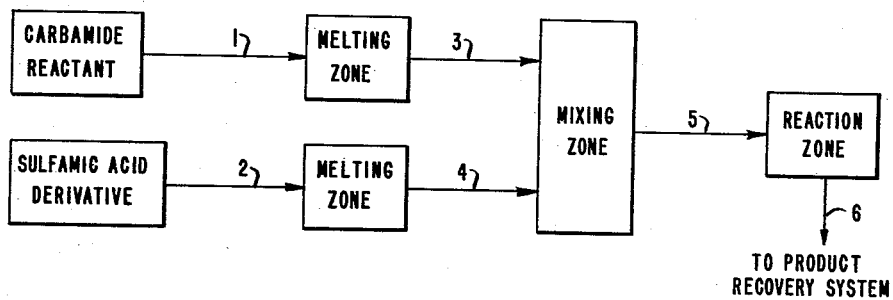

Oct. 8, 1963

K. NOZAKI 3,106,556

MELAMINE PRODUCTION

Filed March 20, 1962

2 Sheets-Sheet 1

INVENTOR:

KENZIE NOZAKI

BY: Lewis C. Brown

HIS ATTORNEY

Oct. 8, 1963   K. NOZAKI   3,106,556
MELAMINE PRODUCTION
Filed March 20, 1962   2 Sheets-Sheet 2

INVENTOR:
KENZIE NOZAKI
BY: Lewis C. Brown
HIS ATTORNEY

United States Patent Office 3,106,556
Patented Oct. 8, 1963

3,106,556
MELAMINE PRODUCTION
Kenzie Nozaki, El Cerrito, Calif., assignor to Shell Oil Company, New York, N.Y., a corporation of Delaware
Filed Mar. 20, 1962, Ser. No. 181,032
7 Claims. (Cl. 260—249.7)

This invention relates to a process for the production of melamine. More particularly, the present invention relates to a method for the manufacture of melamine from a carbamide and a derivative of sulfamic acid.

Melamine may be synthesized commercially from dicyandiamide, which is obtained from calcium cyanamide via cyanamide. Another process for the commercial preparation of melamine is based on urea. In this process urea at 350–500° C. and 3000–4500 p.s.i.g. in the presence of ammonia is converted to melamine according to the reaction:

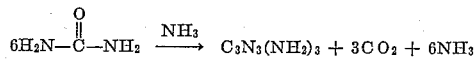

Both of these processes have disadvantages, however. For example, the dicyandiamide process involves several steps at very high temperatures and/or pressures. The urea process requires high pressures and yields only one mole of melamine from six moles of urea.

It is known that relatively low yields of melamine may be prepared by reacting one mole of urea and two moles of ammonium sulfamate at atmospheric pressure. Such a process is disclosed by Mackay in U.S. Patent 2,566,228, issued August 28, 1951. Other processes which use urea and ammonium sulfamate reactants require the use of ammonia as an additional reactant. Frequently, such processes will employ other reactants (for example, sulfur dioxide) as well as high ammonia pressures in an effort to increase both the yield and purity of the melamine product.

One of the chief disadvantages of the processes heretofore used to produce melamine has been due to the simultaneous production of troublesome side products. Thus, products such as elemental sulfur, ammeline, guanidine sulfate, guanidine sulfamate, carbon dioxide, cyanuric acid, ammelide, and dicyandiamide, frequently contaminate the melamine in substantial quantities. Such products not only interfere with the formation of further amounts of melamine but, in addition, their presence in the melamine product may render the product unfit for its commercial use. For example, when guanidine sulfate is produced in the reaction, it frequently causes the formation of a plastic mass which interferes with any continuous process and gives a product which is difficult to handle.

It is an object of the present invention to provide a convenient process for the preparation of very pure melamine in high yields. Another object of the invention is to provide a process which minimizes the formation of troublesome by-products during the production of the melamine.

These and other objects may be accomplished by the reaction of a sulfamic acid derivative and a carbamide at superatmospheric pressure without the addition of any other materials, either for use as a reaction medium or as an additional reactant.

Figure 2:
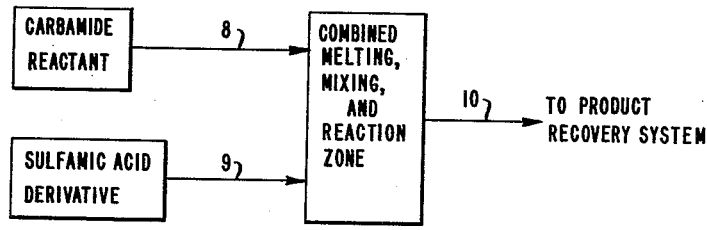
Figure 3:
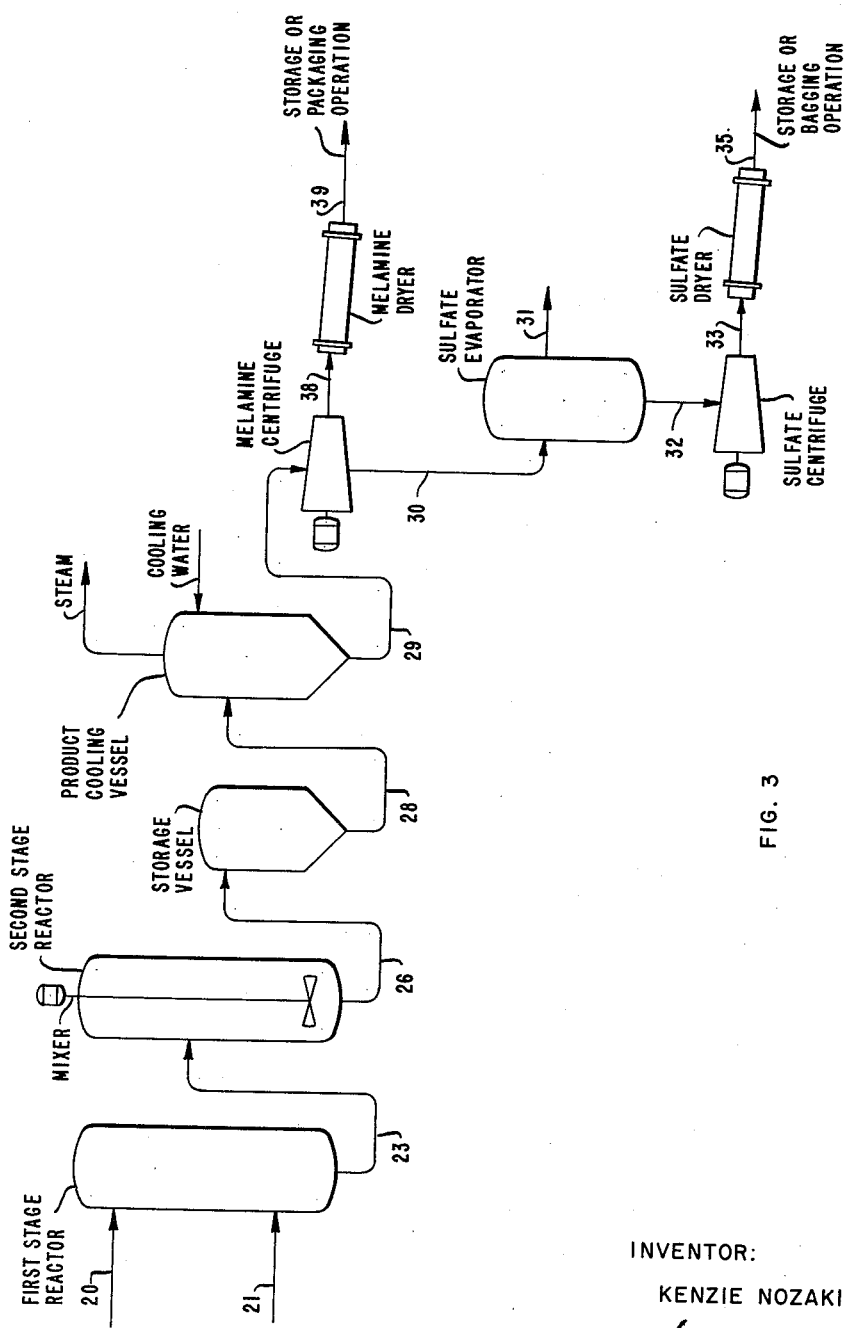

FIGURES 1 and 2 illustrate schematically two variations of the process of the present invention. FIGURE 3 represents a particular embodiment of the process. The processes exemplified by these figures are particularly adapted for reactants with melting points below about 325° C.

The carbamide reactant employed in the process of the present invention may be urea or an N,N'-hydrocarbon-substituted carbamide of the formula:

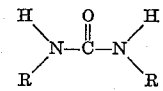

wherein each R is independently selected from the group consisting of hydrogen, aryl hydrocarbon groups of from 6 to 10 carbon atoms, and a lower alkyl group (1–4 carbon atoms). Suitable examples of such compounds include urea, n-butyl urea, sec-butyl urea, tert.-butyl urea, N,N'-diethyl urea, N,N'-dimethyl urea, N,N'-diphenyl urea, N-ethyl-N'-phenyl urea, propyl urea, N-methyl-N'-ethyl urea, and N,N'-dipropyl urea. When alkyl-substituted ureas are employed in the process, the corresponding alkyl-substituted melamines are produced. Best yields are obtained when unsubstituted carbamide (i.e., urea) is employed in the process and the product is an unsubstituted triazine (melamine).

The second class of reactants which is used in the process of the present invention is composed of derivatives of sulfamic acid; for brevity, they are referred to as sulfamates. These derivatives fall into two main groups. The first group includes salts of sulfamic acid such as alkali metal sulfamates (especially sodium and potassium sulfamate), alkaline earth metal sulfamates (especially calcium sulfamate), and ammonium sulfamate, i.e., alkali sulfamates, alkali intending to include ammonium. Other examples of suitable sulfamic acid salts include those salts formed from sulfamic acid and tertiary bases, such as tertiary amines. Sulfamic acid salts formed from heterocyclic amines such as pyridine (and lower alkyl-substituted pyridines) may also be used. The use of ammonium sulfamate is preferred. It has been found that the yield of melamine obtained with ammonium sulfamate is in general higher than the yields obtained with other sulfamic acid salts. The second group of sulfamic acid derivatives are amides of sulfamic acid, for example, sulfamide.

When a sulfamic acid salt is employed in the process of the present invention, essentially equimolar amounts of sulfamic acid salt and carbamide are employed. Variations of up to 10% molar excess of either reactant from the mole ratio of 1:1 (carbamide:sulfamic acid salt) are permissible, but even this variation results in lowering the yield of melamine somewhat. For example, a 10% molar excess of ammonium sulfamate (based on the moles of urea used) gave an 87.5% yield of melamine rather than a 91% yield obtained with exactly a 1:1 mole ratio (ammonium sulfamate:urea) after reaction for 3 hours at 310° C. The purity of the melamine so formed dropped from 99+% to 96%. In order to maintain the yields of melamine at a very high level, the ratio of sulfamic acid salt to urea can be kept in the range of from .95–1.05 moles of sulfamic acid salt per .95–1.05 moles of urea. Best results are obtained when the variation from an essentially 1:1 molar mixture is kept at a minimum.

One of the features of the present invention is that the mole ratio of the reactants in the reaction zone may be easily controlled, thereby eliminating a factor which contributes to unwanted by-product formation. This is accomplished primarily by preventing the condensation or loss of reactants or intermediates from the system. According to the process of the present invention, a mixture of the reactants in the liquid state is gradually converted to a completely solid reaction product. While some sublimation of the reactants occurs, most of the effects of sublimation and condensation have been avoided by limiting the free space in the reactor, and by maintaining the temperature as uniform as possible throughout the system. While inert diluents may be used to facilitate the flow of materials through the system, it has been found that diluents are not essential to the process because the final reaction product may be obtained in the form of a free-flowing sand-like material. Thus, the reaction may be conducted continuously in the most simple types of process equipment because at all stages of the reaction the materials are either in the form of a liquid, a moving slurry, or a free-flowing, finely divided, solid product. When stoichiometric quantities of the reactants are used in the reaction, essentially only two products are obtained: a melamine and a water-soluble sulfate salt.

When a sulfamide is employed in the process of the present invention rather than a salt of sulfamic acid, it is possible to reduce the mole ratio of sulfamide to carbamide to a ratio of about 0.5:1. Again, it is possible to deviate from this ratio by a factor of about ±25% (i.e., sulfamide:urea ratios of from .37–.63:.75–1.25 may be used). For example, it has been found that a 20% molar excess of sulfamide over the stoichiometric amount (based on urea) reduced the melamine yield from 87.5% to 85% after 5 hours' reaction at 310° C. The purity of the melamine in this example was reduced from 92% to 89%. With the exception of the mole ratio of sulfamide:urea, all of the process conditions are the same as are employed when a salt such as an ammonium, alkali metal, or other sulfamate is used in the process.

When either a sulfamide or a salt of sulfamic acid such as ammonium sulfamate is reacted with a urea compound according to the process of the present invention, the reaction product is obtained in the form of a porous material which may readily be broken up into a fine sand with agitation. The reaction product is a mixture of a sulfate salt (ammonium sulfate or potassium sulfate, for example) and very pure melamine. The melamine may be separated from the sulfate salt by conventional methods. Leaching of the mixture of reaction products with water is an especially convenient method when a water-soluble sulfate salt is present in admixture with the melamine. For example, if the reaction product is a mixture of melamine and ammonium sulfate (obtained by the reaction of urea with either sulfamide or ammonium sulfamate), then the ammonium sulfate may be dissolved in water and the resulting solution separated from the only slightly water-soluble melamine. The leaching operation may be conducted at room temperature (18–30° C.) with only slight losses of melamine. The use of ice water in an amount just sufficient to dissolve the ammonium sulfate minimizes the loss of melamine (about .6% by weight of the melamine dissolves).

The process of the present invention is conducted at moderate temperatures and pressures. Temperatures of from 280° to 340° C. and pressures of from 50 p.s.i.g. to 500 p.s.i.g. give good results measured in terms of yields and purity of melamine. While pressures as high as 1000 p.s.i.g. may be used when the temperature is held in the range of from 280° to 340° C., the use of high pressures offers no particular advantages and it is more economical to operate in the lower pressure ranges. One of the features of the present invention is that very high yields of melamine may be obtained without the use of excessively high pressures. The preferred temperature and pressure ranges are from 300° C. to 325° C. at pressures of from 100 p.s.i.g. to 350 p.s.i.g. When urea is reacted with either a sulfamide or a salt of sulfamic acid such as the pyridine salt of sulfamic acid, ammonium sulfamate, or an alkali metal sulfamate such as sodium sulfamate, the optimum temperature range has been found to be from 300° to 325° C. with pressures of from 100 p.s.i.g. to 350 p.s.i.g. Thus, excellent results have been obtained with equimolar mixtures of urea and ammonium sulfamate at temperatures of from 300° to 325° C. and pressures of from 100 p.s.i.g. to 350 p.s.i.g., inclusive. Similar results are obtained under these operating conditions when one mole of urea or a substituted urea is reacted with one-half mole of sulfamide.

The time required for the reaction varies with temperature as well as somewhat with the amount of agitation employed during the reaction and with the uniformity of the initial reaction mixture. Thus, a reaction time of from one to ten hours, inclusive, may be employed when the reactants are held at a temperature of from 280° C. to 330° C., and a pressure of from 100 p.s.i.g. to 400 p.s.i.g. With a wider range of reaction times (.5–12 hours), temperatures of from 250° C. to 350° C. may be used. Excellent results are obtained when the reactants are held for five hours at a temperature of about 310° C. and a pressure of about 200 p.s.i.g. Longer reaction times (10 hours) produce 99% yields of a water-insoluble product which contains over 99% by weight of melamine. Reaction times of at least one hour are preferred and reaction times of from two to six hours are usually sufficient for obtaining excellent yields of high purity melamine compounds.

The pressures used in the process were determined either by means of an external gauge or, in the case of a sealed tube, by determining the external pressure necessary in order to avoid fracturing of the tube.

It is not necessary to add additional reagents to the reactants used in the process of the present invention. Thus, the addition of ammonia in order to maintain the moderate pressure requirements of the process is entirely unnecessary. In the instant process the production of additional side products such as sulfur is almost entirely avoided, as can be readily seen from the yields and purity of the melamine obtained from the process. The addition of sulfamic acid to the process, for example, proved detrimental to product quality. While diluents such as sulfur or diphenyl and diphenyl oxide may be used, such diluents may decrease the rate of melamine formation or increase pressure requirements. Such diluents may be added for convenience, but are not necessary to the process.

The reactants employed in the process of the present invention are generally used in stoichiometric amounts. That is, amounts of the reactants which are necessary to maintain the chemically correct proportions are used. When a sulfamate salt (such as an alkali metal sulfamate, ammonium sulfamate, or a pyridine salt of sulfamic acid) is reacted with a carbamide, the chemically correct proportion of sulfamate salt to carbamide is in the mole ratio of 1:1. When sulfamide is used in place of a sulfamate salt, the chemically correct proportion of carbamide to sulfamide is in the mole ratio of 2:1. Thus, the presence of impurities in one or more of the reactants will require that a greater amount of the impure reactant be used in order to obtain stoichiometric amounts of the reactants, based on the pure chemicals. Water is an impurity which should be particularly avoided in order to prevent the hydrolysis of urea to carbon dioxide and ammonia. In addition, the presence of water tends to convert the sulfamate salts into the corresponding sulfates. The presence of impurities may also raise the pressure requirements of the process of the present invention.

The process of the present invention may be operated batchwise or continuously. When the process is conducted batchwise (for example, in a reactor which is emptied completely after each run), from 40 to 100% (preferably from 60 to 100%) of the reactor space may be occupied by the initial reactants. The reactants may be mixed in solid or in liquid (molten) form before conducting the reaction. Alternatively, the reactants may be merely added to the reactor in the correct molar ratios and mixed by thermal agitation during the course of the reaction. When conducting the reaction in the reactor, it is extremely important to maintain the entire reactor at a uniform temperature throughout the course of the reaction. It has been found that the presence of cool spots in the reactor (where the reactants may condense out during the reaction) has a very deleterious effect both on the product purity and on the yield of melamine in the process. Thus, when the reaction was conducted in a reactor which included a cool section, it was found that a mixture of contaminating side products was produced in this cool zone of the reactor. These unwanted side products seriously degrade the quality of the final product. These impurities also interfere with the formation of further amounts of melamine by producing complexes with the initial reactants and by changing the mole ratios of the initial reactants. The cool zone may also condense out intermediates necessary for the formation of melamine.

The reactor used in the process may be composed of conventional materials such as stainless steel, glass, ceramic material, or brick. Either a glass or a brick-lined reactor and/or process system may be advantageously employed. Glass-lined or glass reactors may be used in the process of the present invention because of the low pressure operation of the system. Brick- or ceramic-lined systems have the advantage of being relatively cheaper and generally maintain a more uniform distribution of heat throughout the system.

It has been found that the use of open vessels at atmospheric pressure resulted in the production of very little melamine, producing instead large amounts of cyanuric acid, ammelide, and ammeline. Excess reactor volume is also harmful to yield if a part of the reactor volume is not at reactor temperature. Purer melamine was obtained with glass reactors than was obtained with stainless steel reactors.

In FIGURE 1, the carbamide reactant (which may be urea or an alkyl-substituted urea) is fed through line 1 to a melting zone. The molten reactant is then fed to a mixing zone through line 3. Similarly, the sulfamic acid derivative is transferred through line 2 to a melting zone and the melted sulfamic acid derivative is then sent to the mixing zone through line 4. Sulfamic acid derivatives with very high melting points may be merely heated in the melting zone and the heated solids may then be mixed with the molten carbamide in the mixing zone to form a slurry. In the drawing, lines 1 and 2 represent any convenient means of transferring the reactants to the melting zone. The molten mixed reactants are sent to the reaction zone through line 5. When the reaction is completed, the products (a mixture of solids) are sent through line 6 to the product recovery system where the melamine is separated.

FIGURE 2 represents a modification of FIGURE 1 wherein the melting zone, mixing zone, and reaction zone are combined. The carbamide reactant is sent to this combined zone by way of line 8, the sulfamic acid derivative is delivered to the combined melting, mixing, and reaction zone by way of line 9. The reactants are melted and mixed during the course of the reaction. When the reaction is completed, the solid mixture of products is sent through line 10 to the product recovery system where the melamine is separated.

FIGURE 3 represents a specific embodiment of the process of the present invention in which melamine is produced from urea and ammonium sulfamate. In the process exemplified by FIGURE 3, liquid urea and ammonium sulfamate at from 250° to 300° F. is fed through lines 20 and 21, respectively, to a first stage reactor of 3800 gallons capacity. A suitable reactor for this purpose is a 5'6" x 20' prestressed, bricklined reactor which is hot oil jacketed and adapted to operate at from 200–300 p.s.i.g. at 600° to 640° F. The time which the reactants spend in the first stage reactor may vary from 20 minutes to 3 or 4 hours. The second stage reactor employs a mixer which is rated at 50 horsepower and also adapted for intermittent operation. The second stage reactor is also a 3800 gallon capacity 5'6" x 20' prestressed, bricklined, hot oil jacketed reactor which operates at 200–300 p.s.i.g. and 600° to 640° F. The mixture of reactants and reaction products from the first stage reactor may be kept in the second stage reactor for from 1 hour to 5 or 6 hours. Optimum operation of the two reactors is obtained when the combined time of the reactants in the reactors is from 1 to 5 hours. The reactants may stay in the reactors for longer periods of time but no substantial economic advantages are obtained thereby. The mixture of reaction products (which are now in finely divided solid form) from the second stage reactor are fed through line 26 (which may be a conveyor of 56,000 lbs. per hour capacity and adapted for intermittent operation) to a storage vessel. The storage vessel may be of stainless steel or other inert material and is at least large enough to hold one reactor load (3800 gallons). The products in the storage vessel are slightly below the temperature in the second stage reactor. Usually the products in the storage vessel are at approximately 610–630° F. From the storage vessel the products are fed to a product cooling vessel of carbon steel or other suitable material. A cylindrical hopper 7 feet in diameter with a height of 10 feet is used. Cooling water at 80–90° F. is fed to the cooling vessel at a rate of 26 gallons per minute or 12,870 pounds per hour. The feed of hot reaction products to the cooling vessel is adjusted so that steam is given off at a rate of 1870 lb./hr. when the pressure within the vessel is reduced to 50 mm. Hg and the melamine slurry is cooled to 104° F. Under these continuous, steady state conditions a slurry composed of 11,000 lb./hr. of water, 2540 lb./hr. of melamine and 8,876 lb./hr. of dissolved ammonium sulfate salts is obtained and fed through line 29 to melamine centrifuge. The melamine centrifuge is of the bird bowl type and rated at 36 gallons per minute based on a slurry which contains 11% solids. The melamine centrifuge should be capable of handling 30 tons per day of solids. Dissolved sulfate salts from the centrifuge are fed through line 30 to a sulfate evaporator with approximately 700 square feet of surface. The sulfate evaporator accomplishes a preliminary concentration of the sulfate solution and is operated at 100–110° F. and 40–60 mm. of Hg. Concentration of the sulfate solution is continued until the salts precipitate out and form a slurry which is sent via line 32 to the sulfate centrifuge. The sulfate centrifuge is also of the bird bowl type and operates at a feed of 50 gallons per minute. The sulfate centrifuge should be capable of handling 100 tons per day of solids. Line 33 transfers the dewatered sulfate salts from the sulfate centrifuge to the sulfate dryer where the remaining moisture adhering to the sulfate salts is removed. The sulfate dryer may be any convenient type. A hot air dryer which will evaporate 300 lb. water per hour and will handle a total of 100 tons per day of the wet salts is satisfactory. The dried sulfate salts (almost entirely ammonium sulfate) are then delivered by line 35 (which may be a conveyor) to either a storage area or to a bagging operation. Water vapor from the sulfate evaporator is removed through line 31 and may be either wasted or condensed and recycled to the cooling vessel. Damp melamine from the melamine centrifuge is sent through line 38 to the melamine dryer where the last traces of water are removed. A melamine dryer of the hot air type which converts 150 lbs. of water per hour to the vapor state is used. Any type of dryer capable of handling 30 tons per day of wet or dry solids may be employed. The final product (dry melamine) is taken from the melamine dryer through line 39 and delivered to either a storage area or to a packaging operation. Continuous operation of the process as described in FIGURE 3 yields 30 tons per day of dry, high quality melamine.

A catalyst may be used to reduce the reaction time in the process of the present invention. Suitable catalysts include minor amounts of compounds of boron, phosphorus, arsenic or antimony. The oxides of such compounds ($P_2O_5$, $As_2O_3$, and $B_2O_3$, for example) may be used in catalytic amounts (up to about one or two percent based on the total weight of the reactants). It is to be noted, however, that the use of such catalyst will somewhat reduce the product purity of the melamine due to contamination of the melamine with minor amounts of catalyst. If pure melamine is required, the process may either be conducted without a catalyst, or the catalyst may be removed from the melamine in a separate purification step.

In the process of the present invention it is especially surprising that the process may be conducted without the addition of ammonia. Previously, it was believed necessary to add ammonia to the reactants in order to prevent the self-condensation of melamine with the consequent formation of undesirable side products such as melam, melem and melon. When the process is conducted according to the present invention, however, the formation of these undesirable contaminants is almost entirely prevented without the additional step of delivering ammonia to the reaction zone.

The following examples are submitted to more fully illustrate the process of the present invention but are not to be construed as limiting the scope of the invention in any way.

EXAMPLE I

An equimolar mixture of anhydrous ammonium sulfamate (0.0833 mole) and anhydrous urea (0.0833 mole) were placed in a thickwalled Pyrex tube (20 mm. x 100 mm.) which had been necked down to facilitate sealing. The reactants were heated to about 130–135° C. to fuse the mixture (both ammonium sulfamate and urea melt at 133° C. and drive off adsorbed air before the tube was sealed off. The mixture was shaken well in the sealed tube while fused. The tube was placed in a stainless steel pressure vessel and a pressure of 200–300 p.s.i.g. of nitrogen was applied within the pressure vessel. The vessel containing the tube was heated to 310° C. within a period of 10–15 minutes in an electrically heated furnace. This temperature and pressure was maintained for a five hour period. The vessel was then chilled rapidly in water to room temperature and cooled in Dry Ice. The vessel was vented, opened, and the glass tube removed. The tip of the glass tube was broken off to release any pressure and the tube was then broken near the center. The contents of the tube in the form of a slightly porous solid were removed and powdered with a spatula. After weighing, 25 ml. of water was added and the mixture was allowed to stand for 15–30 minutes at room temperature. The mixture was filtered through a weighed sintered glass funnel and the residue was washed with 20 ml. of water and a small amount of ethanol. The residue was dried in a vacuum oven at 70° C. and weighed. A correction was applied for the solubility of melamine in the aqueous filtrate. The solid product was analyzed by the Kjeldahl method for nitrogen content. The melamine content was determined by dissolving a sample of the product in boiling water and adding oxalic acid in ethanol to precipitate the oxalic acid-melamine complex. The precipitate was filtered, washed, dried and weighed. The melamine content was calculated after a correction for the insolubles in the product had been applied. Over 99% by weight of the water-insoluble material was pure melamine. The overall yield of melamine based on urea or ammonium sulfamate was 94%.

EXAMPLE II

Example I was repeated but with a glass liner in a stainless steel reaction vessel rather than a sealed glass tube. The percent melamine in the water-insoluble portion of the reaction product was 93% by weight. The yield of melamine based on urea or ammonium sulfamate was 89% of theory.

EXAMPLE III

Example I was repeated but at a temperature of 325° C. The percent by weight of melamine in the water-insoluble portion of the reaction product amounted to 87%. The yield of melamine based on urea or ammonium sulfamate was 77% of theory.

EXAMPLE IV

The procedure of Example I was followed, but the reaction was only allowed to proceed for three hours. Over 99% by weight of the water-insoluble portion of the reaction product was melamine. The yield of melamine based on urea or ammonium sulfamate was 91% of theory.

EXAMPLE V

Following the procedure of Example I, but with a total reaction time of 10 hours, over 99% by weight of the insoluble portion of the reaction product was found to be melamine. The total yield of melamine based on urea or ammonium sulfamate was 99%.

EXAMPLE VI

Following the procedure of Example I, but with a reaction time of 1.5 hours, 85% by weight of the insoluble portion was melamine. The yield of melamine based on urea (or ammonium sulfamate) was only 52% of theory.

EXAMPLE VII

Using the procedure of Example I, but with a mole ratio of urea to ammonium sulfamate of 1:2, a water-insoluble product containing 69% by weight of melamine was obtained. The total yield of melamine was 59%.

EXAMPLE VIII

Example VII was repeated, but with a mole ratio of urea to ammonium sulfamate of 2:1. A water-insoluble product containing 64% by weight of melamine was obtained. The yield of melamine based on ammonium sulfamate was 54% of theory.

EXAMPLE IX

The procedure of Example I was repeated but at a temperature of 265° C. A water-insoluble product containing 52% by weight of melamine was obtained. The melamine yield based on urea was 27% of theory.

EXAMPLE X

Using the procedure of Example IX but at a temperature of 290° C. a water-insoluble product containing 76% by weight of melamine was obtained. The yield of melamine based on urea or ammonium sulfamate was 59% of theory.

EXAMPLE XI

The procedure of Example I was followed but an additional 20% of sulfur (based on the weight of the combined reactants) was added. The water-insoluble product obtained contained 98% by weight of melamine. The yield of melamine based on urea or ammonium sulfamate was 94%.

EXAMPLE XII

The procedure of Example XI was followed but with 20% Dowtherm A (based on the total weight of the reactants) added to the reaction mixture. Dowtherm A is a mixture of diphenyl and diphenyl oxide. The water-insoluble product obtained contained 99% by weight of melamine. The yield based on urea or ammonium sulfamate was 94%.

EXAMPLE XIII

Example I was repeated but sulfamic acid in an amount equal to 7% by weight of the reactants was added. The water-insoluble product obtained contained only 65% by weight of melamine. The yield based on urea or ammonium sulfamate was also 65%.

EXAMPLE XIV

Following the procedure of Example VI but using a reactor with the top open (atmospheric pressure and reaction time of 1.5 hours) a water-insoluble product was obtained which contained less than 10% by weight of melamine. The yield of melamine based on urea or ammonium sulfamate was less than 4%.

EXAMPLE XV

In this example the procedure of Example I was varied by adding 210 lb. of ammonia pressure cold (500 lb. hot) and conducting the reaction in a closed reactor with an upper cold section. Seventy percent by weight of the water-insoluble material obtained was melamine. The mole ratio of urea to sulfamide of 2:1 with a reaction time of 10 hours. The water-insoluble portion contained 94% by weight of melamine. The yield of melamine based on either the moles of sulfamide or moles of urea charged to the reactor amounted to 90.7%.

The results of Examples I–XXI are given in Table I.

*Table I*

| Example No. | Time, Hrs. | Temp., °C. | Urea, Moles | Sulfamic Acid Derivative, Moles | Urea/Sulfamic Acid Derivative, Mole Ratio | Additives, percent w. | Water Insol., g. | Percent Melamine in Water Insol. | Melamine Yield, percent | Other Conditions |
|---|---|---|---|---|---|---|---|---|---|---|
| I | 5 | 310 | 0.0833 | 0.0833 | 1 | None | 3.34 | +99 | 94 | |
| II | 5 | 310 | 0.0833 | 0.0833 | 1 | ----do---- | 3.35 | 93 | 89 | Glass liner in stainless steel vessel. |
| III | 5 | 325 | 0.0833 | 0.0833 | 1 | ----do---- | 3.1 | 87 | 77 | |
| IV | 3 | 310 | 0.0833 | 0.0833 | 1 | ----do---- | 3.19 | +99 | 91 | |
| V | 10 | 310 | 0.0833 | 0.0833 | 1 | ----do---- | 3.50 | +99 | 99 | |
| VI | 1.5 | 310 | 0.0833 | 0.0833 | 1 | ----do---- | 2.1 | 85 | 52 | |
| VII | 5 | 310 | 0.0833 | 0.1666 | 0.5 | ----do---- | 3.0 | 69 | 59 | |
| VIII | 5 | 310 | 0.0833 | 0.0417 | 2 | ----do---- | 2.95 | 64 | 54 | |
| IX | 5 | 265 | 0.0833 | 0.0833 | 1 | ----do---- | 1.8 | 52 | 27 | |
| X | 5 | 290 | 0.0833 | 0.0833 | 1 | ----do---- | 2.7 | 76 | 59 | |
| XI | 5 | 310 | 0.0833 | 0.0833 | 1 | 20% S | 3.40 | 98 | 94 | |
| XII | 5 | 310 | 0.0833 | 0.0833 | 1 | 20% Dowtherm A[1] | 3.34 | 99 | 94 | |
| XIII | 5 | 310 | 0.0833 | 0.0833 | 1 | 7% sulfamic acid | 3.5 | 65 | 65 | |
| XIV | 1.5 | 310 | 0.0833 | 0.0833 | 1 | None | 1.3 | <10 | <4 | Top of reactor open, atm. press. |
| XV | 1.5 | 310 | 0.0833 | 0.0833 | 1 | ----do---- | 1.7 | 70 | Ca. 30 | Top of reactor cold: NH3 under press. added. |
| XVI | 1.5 | 310 | 0.0833 | 0.0833 | 1 | ----do---- | 1.6 | <50 | Ca. 20 | Top of reactor cold. |
| XVII | 5 | 310 | 0.0833 | 0.0417 | 2 | ----do---- | 3.25 | 92 | 86 | |
| XVIII | 5 | 290 | 0.0833 | 0.0417 | 2 | ----do---- | 2.65 | 73 | 55.4 | |
| XIX | 5 | 265 | 0.0833 | 0.0417 | 2 | ----do---- | 1.90 | 50 | 27.2 | |
| XX | 5 | 310 | 0.0833 | [2] 0.0833 | 1 | ----do---- | 1.94 | 0 | 0 | |
| XXI | 10 | 310 | 0.0833 | 0.0417 | 2 | ----do---- | 3.37 | 94 | 90.7 | Sealed glass tube. |

[1] A mixture of diphenyl and diphenyl oxide.
[2] Moles of sulfamic acid.

yield of melamine based on urea or ammonium sulfamate was about 30%.

EXAMPLE XVI

Example XV was repeated but with the omission of ammonia pressure. The upper portion of the reactor was cold. Less than 50% by weight of the water-insoluble material was melamine. The yield of melamine based on urea or ammonium sulfamate was about 20%.

EXAMPLE XVII

The procedure and conditions of Example I were followed but sulfamide was substituted for ammonium sulfamate and the mole ratio of urea to sulfamide was 2:1. The water-insoluble portion contained 92% by weight of melamine. The total yield of melamine based on the moles of sulfamide (or urea) charged to the reactor was 86%.

EXAMPLE XVIII

Example XVII was repeated, but with a reaction temperature of 300° C. The melamine in the water-insoluble portion amounted to 73% by weight. The yield of melamine based on the moles of sulfamide (or urea) charged to the reactor was 55.4%.

EXAMPLE XIX

Example XVII was repeated but with a reaction temperature of 275° C. The melamine in the water-insoluble portion amounted to 50% by weight. The yield of melamine based upon the moles of sulfamide (or urea) charged to the reactor was 27.2%.

EXAMPLE XX

The procedure and conditions of Example I were again used but with an equimolar mixture of sulfamic acid and urea. The melamine in the water-insoluble portion amounted to 0% by weight. The yield of melamine based upon the moles of sulfamic acid or urea charged to the reactor was 0%.

EXAMPLE XXI

The procedure of Example XVII was followed using a mole ratio of urea to sulfamide of 2:1 with a reaction time of 10 hours. The water-insoluble portion contained 94% by weight of melamine. The yield of melamine based on either the moles of sulfamide or moles of urea charged to the reactor amounted to 90.7%.

Further examples are summarized in Table II which shows the variation in melamine yield with different reaction times and temperatures. The results of Examples XXII through XXXII were obtained by mixing equimolar amounts (.0833 mole of each reactant) of urea and ammonium sulfamate in a sealed glass tube, holding the tube at the indicated temperature for a specified time, and analyzing the products formed in the reaction. Internally generated pressures varied with the applied temperatures up to about 1000 p.s.i.g.

*Table II*

[.0833 mole of urea plus .0833 mole of ammonium sulfamate]

| Example No. | Time (hrs.) | Temp. (° C.) | Water Insol. (grams) | Percent Melamine in Water Insol. | Melamine Yield Percent |
|---|---|---|---|---|---|
| XXII | 6 | 275 | 2.22 | 63 | 40 |
| XXIII | 3 | 300 | 2.77 | 94 | 74.5 |
| XXIV | 6 | 300 | 3.41 | 99 | 96 |
| XXV | 3 | 310 | 3.21 | 98 | 90 |
| XXVI | 6 | 310 | 3.39 | 99 | 96 |
| XXVII | 3 | 317 | 3.33 | 99 | 94 |
| XXVIII | 2.2 | 320 | 3.13 | 100 | 90 |
| XXIX | 1.5 | 323 | 2.48 | 91 | 65 |
| XXX | 1.5 | 330 | 2.59 | 95 | 70 |
| XXXI | 2.0 | 330 | 2.70 | 96 | 74 |
| XXXII | 3 | 330 | 3.23 | 95.0 | 97.8 |
| XXXIII [1] | 5 | 310 | 3.11 | 14.2 | 12.5 |
| XXXIV [2] | 6 | 310 | 3.33 | 97.2 | 92.0 |

[1] Instead of ammonium sulfamate, the pyridine salt of sulfamic acid was used (formed with .0833 mole of pyridine and .0833 mole of sulfamic acid).
[2] Instead of ammonium sulfamate, sodium sulfamate and urea were reacted in a 1:1 mole ratio (.0833 mole of urea and .0833 mole of sodium sulfamate).

I claim as my invention:

1. A process for the production of substantially pure melamine which comprises reacting urea and sulfamide in a urea:sulfamide mole ratio of about 2:1 at a temperature of from 280° to 340° C. under a pressure of at least 50 p.s.i.g.

2. A process for the production of substantially pure melamine which comprises reacting stoichiometric amounts of sulfamic acid salt and urea at a uniform temperature of about 310° C. and a pressure of about 200 p.s.i.g. without the addition of ammonia and wherein from about 60 to 100% of the reaction zone is occupied the the initial reactants.

3. A process for producing melamine which comprises
   (a) mixing essentially equimolar amounts of an alkali metal sulfamate and urea to form a liquid reaction mixture, and
   (b) heating said liquid reaction mixture at a temperature of from 280° C. to 340° C. at a pressure of from 50 to 500 p.s.i.g. for a period of from 1 to 10 hours.

4. The process of claim 3 wherein the alkali metal sulfamate is sodium sulfamate.

5. A process for producing melamine which comprises reacting essentially equimolar amounts of the pyridine salt of sulfamic acid and urea at a temperature of from 280° C. to 340° C. at a pressure of from 50 to 500 p.s.i.g. for a period of from 1 to 10 hours.

6. A process for the production of substantially pure melamine which comprises
   (a) mixing urea and sulfamide to form a reaction mixture in which the mole ratio of urea to sulfamide is essentially 2:1.
   (b) heating said reaction mixture at a temperature of from 280° to 340° C. under a pressure of from 50 p.s.i.g. to 500 p.s.i.g. for a time period of at least one hour to form a solid reaction product composed essentially of melamine and ammonium sulfate, and
   (c) separating the melamine in free-flowing solid from from said solid reaction product by leaching the solid reaction product with water.

7. A continuous process for the production of substantially pure melamine which comprises:
   (a) continuously contacting liquid urea and ammonium sulfamate in a reactor in which from 60 to 100% of the space is occupied by the initial reactants and which is uniformly operated at from 200–300 p.s.i.g. and from 600° to 640° F. for a period of from 20 minutes to 3–4 hours to form a slurry of reactants and products;
   (b) holding said slurry of reactants and products in a second stage reactor continuously and uniformly operating at essentially the same temperature and pressure as the first stage reactor for a time period of from 1 to 5–6 hours to from a finely divided solid reaction product containing substantially pure melamine; and
   (c) continuously cooling and separating substantially pure melamine in free-flowing solid form from said finely divided reaction product by leaching with water.

References Cited in the file of this patent

UNITED STATES PATENTS

| | | |
|---|---|---|
| 2,464,247 | Mackay | Mar. 15, 1949 |
| 2,566,228 | Mackay | Aug. 28, 1951 |

FOREIGN PATENTS

| | | |
|---|---|---|
| 327,074 | Japan | 1957 |

OTHER REFERENCES

Boivin et al.: Canadian Journal of Chemistry, vol. 33, pages 1222–1225, July 1955.